United States Patent [19]

Awipi et al.

[11] 3,824,413

[45] July 16, 1974

[54] ANALOG FEEDBACK FREQUENCY RESPONSIVE CIRCUIT

[75] Inventors: Mebenin Awipi, Ocean; Sotirios Constantine Kitsopoulos, Summit; Donald Steven Levinstone, Bayonne, all of N.J.

[73] Assignee: Bell Telephone Laboratories, Incorporated, Murray Hill, N.J.

[22] Filed: Feb. 16, 1973

[21] Appl. No.: 333,327

[52] U.S. Cl. ............. 307/295, 307/221 D, 328/167, 330/109, 331/108 C

[51] Int. Cl. ............................................. H03k 1/16

[58] Field of Search ................ 307/221 D, 295, 293; 330/86, 107, 109; 328/137, 138, 167; 331/108 C, 108 D, 135

[56] References Cited

UNITED STATES PATENTS

| | | | |
|---|---|---|---|
| 3,621,402 | 11/1971 | Gardner | 328/167 X |
| 3,621,407 | 11/1971 | Kerwin et al. | 328/167 |
| 3,622,916 | 11/1971 | Fjallbrant | 328/167 X |
| 3,740,591 | 6/1973 | Butler et al. | 307/295 |

*Primary Examiner*—John Zazworsky

*Attorney, Agent, or Firm*—David H. Tannenbaum

[57] ABSTRACT

An active analog delay line is utilized as a feedback element to develop output signals as a function of frequency. The analog feedback delay element is arranged to accept the output signals, sample those signals at a periodic clock rate, and to serially pass the sampled signal from stage to stage in order to achieve the amount of delay desired. The output of the delay device is then summed with an input signal to provide a new output signal. The circuit is useful as a sample delay recursive comb type filter and as a selectively controllable oscillator.

29 Claims, 9 Drawing Figures

FIG. 5

| UPPER BOUNDS ON $\rho$ IMPOSED BY 40 mSEC SETTLING TIME | | |
|---|---|---|
| FREQUENCY | DESIRED CHANNEL FILTER DELAY mSEC | $\rho$ |
| 697 | .71736 | .921 |
| 770 | .64935 | .928 |
| 852 | .58685 | .935 |
| 941 | .53135 | .941 |
| 1209 | .41356 | .954 |
| 1336 | .37425 | .958 |
| 1477 | .33852 | .962 |
| 1633 | .30618 | .965 |

FIG. 6

| CHANNEL FILTER DELAY REQUIREMENTS | | | | | |
|---|---|---|---|---|---|
| NOMINAL FREQUENCY $f_0$Hz | EXACT DELAY $\tau_D = \frac{1}{2f_0}$ mSEC | n NO. BITS FOR 85.146 KHz CLOCK | APPROX DELAY | % ERROR | NEW CENTER FREQUENCY |
| 697 | .71736 | 61 | .7164 | .13 | 698 |
| 770 | .64935 | 55 | .6459 | .52 | 774 |
| 852 | .58685 | 50 | .5872 | .06 | 851 |
| 941 | .53135 | 45 | .5285 | .54 | 946 |
| 1209 | .41356 | 35 | .4111 | .60 | 1216 |
| 1336 | .37425 | 32 | .3758 | .42 | 1330 |
| 1477 | .33852 | 29 | .3406 | .61 | 1468 |
| 1633 | .30618 | 26 | .3054 | .27 | 1637 |

FIG. 7

| CLOCK RATE 85.1 KHz | | | |
|---|---|---|---|
| OUTPUT | FREQUENCY | ANALOG DEVICE | DELAY STAGES |
| FL1 | 697 | 409-1 | 61 |
| FL2 | 770 | 409-2 | 55 |
| FL3 | 852 | 409-3 | 50 |
| FL4 | 941 | 409-4 | 45 |
| FH1 | 1209 | 410-1 | 35 |
| FH2 | 1336 | 410-2 | 32 |
| FH3 | 1477 | 410-3 | 29 |
| FH4 | 1633 | 410-4 | 26 |

FIG. 9

| CLOCK RATE 85.1 KHz | | | |
|---|---|---|---|
| FREQUENCY | SWITCH POSITIONS | ANALOG DEVICE | DELAY STAGES |
| 697 | SW3-1 , SW4-1 | 804-1 | 61 |
| 770 | SW3-2 , SW4-2 | 804-2 | 55 |
| 852 | SW3-3 , SW4-3 | 804-3 | 50 |
| 941 | SW3-4 , SW4-4 | 804-4 | 45 |
| 1209 | SW1-1 , SW2-1 | 805-1 | 35 |
| 1336 | SW1-2 , SW2-2 | 805-2 | 32 |
| 1477 | SW1-3 , SW2-3 | 805-3 | 29 |
| 1633 | SW1-4 , SW2-4 | 805-4 | 26 |

ANALOG FEEDBACK FREQUENCY RESPONSIVE CIRCUIT

BACKGROUND OF THE INVENTION

This invention relates to a circuit for processing signals and, more particularly, to an arrangement whereby using essentially active circuit elements a circuit can be made to provide output signals representative of certain frequencies.

As the state of the electronics art becomes increasingly more sophisticated, the physical size of electronic circuits has continued to decrease and many such circuits have become standardized. Now it has become common for a circuit designer to select standard commercially availale circuit chips, each containing an entire complex electronic circuit.

In many circuit operations it is necessary to detect a specific frequency, or a group of frequencies, and to generate one or more specific frequencies. For example, in the area of telephone communication it is now necessary, for signaling purposes, to generate several discrete TOUCH-TONE signaling frequencies and to detect the presence of such generated frequencies. Typically, in the past, passive filter circuits have been designed to achieve the required detection; that is, such circuits have relied on some combination of passive devices, such as resistors, capacitors and inductors, interconnected in some manner to provide a peak or a null at some prescribed frequency or group of frquencies. These arrangements have the disadvantage that they have fixed response frequencies which are not easily changeable. In addition, such filter circuits are only as accurate as the accuracy of the individual circuit elements and thus do not lend themselves to mass miniaturization techniques and the economics inherent therewith.

Numerous circuits are currently available to perform the filtering function, each based upon a different operational principle. One such circuit is based on a digital concept where the input signal is broken into binary format representative of the signal. A digital arithmetic unit is then used to generate an output signal which is also digital in nature. This digital output signal is then fed back to the arithmetic unit and compared to the input. In the feedback loop there is a digital delay device for delaying the signal a certain amount depending upon the output response desired. Typically, conventional shift registers are used for the delaying of the signal. Although such filters have met with widespread acceptance, they have the drawback that the input signal must first be broken into binary format before further processing can occur. When it is desired to utilize such circuits in an environment where large numbers would be required the cost becomes prohibitive.

Accordingly, a need exists in the art for a simple, inexpensive, frequency-responsive circuit controllable by active elements.

A further need exists in the art for a filter circuit which will provide output signals only in response to certain predetermined input signal frequencies, and which circuit is entirely active in nature, easily changeable, and economically feasible for use in large numbers.

A further need exists in the art for an oscillator circuit which will provide output signals of a certain predetermined frequency, which circuit is entirely active in nature, easily controllable as to the output frequency, and economically feasible for use in large numbers.

SUMMARY OF THE INVENTION

These and other objects of our invention have been achieved by arranging a differential amplifier with an analog feedback loop from the amplifier output to one of the inputs. The feedback loop consists of a delay device having a controllable number of delay stages. The delay device is analog in nature such that the analog signal output from the operational amplifier is delayed and applied, as a full replica of the output signal, to the input of the operational amplifier.

In one embodiment of our invention, the circuit is arranged to provide an output only when the signal on an input to the operational amplifier is of a certain frequency. The delay of the analog signal is then set in a manner such that when the desired signal is present on the input, the output signal will peak.

In another embodiment of our invention, the circuit is arranged to provide an output signal having a certain fixed frequency. In this arrangement, the parameters of the circuit are such that the circuit is unstable. By controlling the number of feedback stages of the analog output signal, the circuit is made to oscillate at the desired frequency.

In another embodiment a number of filters are interconnected to provide output responses when one frequency out of a certain set of frequencies is present.

In still another embodiment a number of such filters are used to establish certain selectable output frequencies.

Accordingly, it is a feature of our invention that a circuit is provided whereby the analog output signal of an operational amplifier is delayed and fed back to an input of the amplifier so as to control the output response of the circuit.

It is another feature of our invention that the delay period of the analog signal which is fed back to the input of an operational amplifier is controllable.

BRIEF DESCRIPTION OF THE DRAWING

FIGS. 5, 6 and 7 are charts useful in understanding the relationships between frequency responses and delay times of the analog feedback lines;

FIG. 9 is a chart showing the number of analog feedback delay stages necessary for a given oscillation rate.

DETAILED DESCRIPTION

Figure 1:
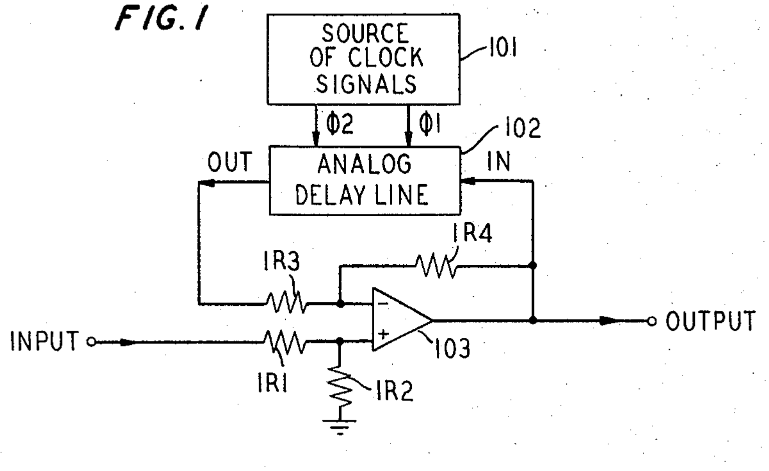
FIG. 1 shows a frequency-responsive circuit using an analog delay line in the feedback loop.

There is shown in FIG. 1 an operational amplifier 103 summation circuit having a noninverting positive input (marked "+"), an inverting negative input (marked "—"), and a single output. This amplifier can be of a type similar to the operational amplifier known as OP- AMP 741 which is commercially available from several well-known electronic component suppliers.

The positive input of the amplifier is connected via resistor 1R1 to the input. The amplifier output is connected to the output of the circuit and to the input of the analog delay line 102. As will be discussed more fully hereinafter, analog delay line 102 serves as a feedback loop to sample the analog signal present at the amplifier output, to propagate the sampled signal from stage to stage in shift register fashion, and to reconstruct the signal at the output. The reconstructed delayed signal is then applied via resistor 1R3 to the negative terminal of the amplifier. The delayed signal is then summed by amplifier 103 and the newly created output signal is then sampled, delayed, and again summed with the input. In this manner we have constructed a recursive comb filter with the amount of analog delay determining the frequency response of the filter.

The precision required for acceptable frequency detection is obtained from the accuracy of the clock. Since clock accuracies of any desired level are easily obtainable, as opposed to the accuracy of resistance ratios, our arrangement is inherently easier to control from a frequency response standpoint. The resistance ratio of 1R4 and 1R3 determines the effective attenuation in the feedback loop and hence the selectivity of the filter. When multichannel filtering is desired, the clock signals can be common to all channels, with only the number of bits or stages of delay varying from channel to channel. This channel filter is expected to be more cheaply obtainable in compact integrated form than a typical Active-RC channel filter since standard integrated circuit components can be used and since, contrary to the Active-RC filters, the resistive or capacitive components do not have to be controlled in absolute value.

Clock source 101 provides two periodic complementary signals, Φ1 and Φ2, to analog delay line 102. These signals serve to control the analog delay line 102 which, in one embodiment, is a bucket bridage device of the type discussed by F. L. J. Sangster and K. Teer in an article entitled "Bucket-Brigade Electronics-New Possibilities for Delay, Time-Axis Conversion, and Scanning", *IEEE Journal of Solid-State Circuits*, Vol. SC-4, No. 3, June 1969. The construction of such a device is taught by C. N. Berglund and H. J. Boll in U.S. Pat. No. 3,660,697 dated May 2, 1972.

Figure 2:
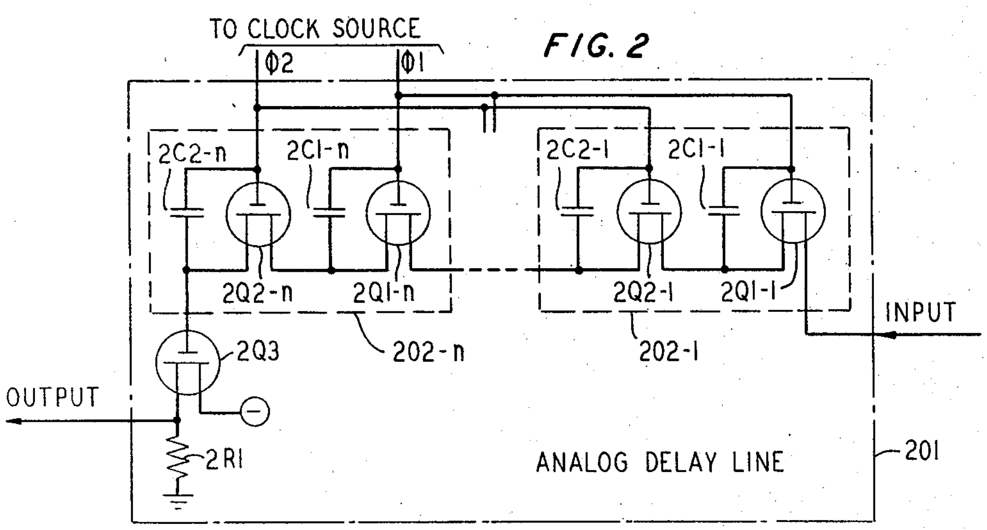
FIG. 2 is a detailed schematic showing a bucket brigade analog delay line.

FIG. 2 shows such a bucket brigade analog delay line 201 having a plurality of delay stages 202–1 through **202–*n* and an output stage controlled by transistor 2Q3. Analog delay line 201 is controlled by clock signals Φ1 and Φ2 such that an input signal on the input lead is sampled under control of clock signal Φ1 by transistor 2Q1–1. Thus, at time Φ1, transistor 2Q1–1 turns on and allows capacitor 2C1–1 to charge to the instantaneous value of the signal on the input lead at that time. At time Φ2, the charge on capacitor 2C1–1 is transferred via transistor 2Q2–1 to capacitor 2C2–1. At the next clock pulse Φ1, the charge on capacitor 2C2–1 is passed to the next stage, which in FIG. 2 is stage 202–*n*, via transistor 2Q1–*n* to capacitor 2C1–*n*. At the same time the new value of the input signal is communicated, via transistor 2Q1–1, to capacitor 2C1–1.**

Accordingly, under control of the alternating clock pulses Φ1 and Φ2, the signal input to the bucket brigade device is sampled and the sample voltage is moved from stage to stage through the device. At the output of the device the signal samples are removed from the propagation stages and summed to produce a sampled replica of the input signal, which replica has been delayed a certain amount of time from the original input signal.

Of course, it is to be noted that the delay time is controlled jointly by the clock rate and by the number of stages of propagation delay. The relationships between the frequency characteristics of the circuit and the clock rate and propagation stages of the analog delay line will be developed in a later section of this specification.

The analog delay line 201 which is shown is referred to as a ½-wave device. Such devices may be connected so that the input signal is sampled both by clock pulse Φ1 and by clock pulse Φ2. Under such an arrangement, two ½-wave delay lines would be connected in parallel and the outputs connected in common so that the output signal from the combined devices would be a closer approximation to the actual input signal than would be obtained using a single ½-wave device. Of course, the same smoothing effect can be achieved in a single ½-wave device by increasing the signal sampling rates of Φ1 and Φ2.

Determination of Delay Period and Clock Signal Rate

Figure 3:
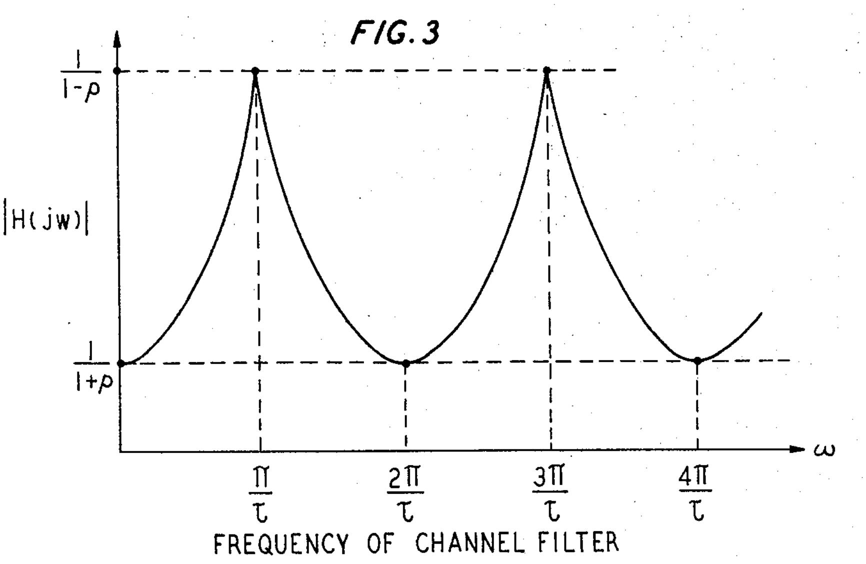
FIG. 3 shows the frequency response of the filter shown in FIG. 1.

The voltage transfer function of the circuit of FIG. 1 is $$H(s) = 1/(1+\rho e^{-s\tau}) \qquad 1.$$

where $\rho$ is the attenuation of the feedback loop, $e$ is the the natural exponential constant, $s$ is the complex frequency variable, and $\tau$ is the amount of delay. The steady-state magnitude response is $$|H(j\omega)| = 1/[\sqrt{1+\rho^2+2\rho \text{ Cos } \omega\tau}] \qquad 2.$$

and is shown in FIG. 3. We observe the periodicity of the frequency response, with the first peak occurring at $\omega = \pi/\tau$ or $f = ½\tau$ Hz. The area around the first peak is the region of primary interest for frequency detection. To locate the center frequency of this region at any desired frequency $f_o$, we pick a delay for that channel of duration $$\tau_D = ½f_o \qquad 3.$$

The primary effect of the periodicity of the response is to make the filter potentially more susceptible to wideband noise. However, by limiting the signaling band in which frequencies can be supplied to the input to a point where the third harmonic of the lowest desired frequency is outside the signaling band, simple prefiltering will be adequate. This is especially true for the frequencies necessary for TOUCH-TONE frequency detection, which are 697 Hz, 770 Hz, 852 Hz, 941 Hz, 1209 Hz, 1336 Hz, 1477 Hz and 1633 Hz. On the other hand, the odd-harmonic periodicity enhances the response of the filter to a square-wave input derived from the limiter, thus giving improved signal-to-noise performance over the case of a pure sine wave input.

The selectivity of the channel filter in the region around the first peak is derived as follows:

At the center frequency, $\omega_o = \pi/\tau$, $$|H(\omega_o)| = 1/(1-\rho) \qquad 4.$$

The half-power frequency is given by $$\sqrt{2}(1-\rho) = \sqrt{1+\rho^2+2\rho \text{ Cos } \omega_1\tau} \qquad 5.$$

or $$\omega_1 = \frac{1}{\tau} \operatorname{Cos}^{-1}\left(\frac{1-4\rho+\rho^2}{2\rho}\right) \quad (6)$$

Hence the selectivity Q is given by $$Q = \frac{\omega_0}{2|\omega_0-\omega_1|} = \frac{\pi}{2\left|\pi - \operatorname{Cos}^{-1}\left(\frac{1-4\rho+\rho^2}{2\rho}\right)\right|} \quad (7)$$

or $$Q = \frac{\pi}{2 \operatorname{Cos}^{-1}\left[-\left(\frac{1-4\rho+\rho^2}{2\rho}\right)\right]} \quad (8)$$

where, in Equations 7 and 8, the principal value of the arc cosine function is taken.

The upper bound on $\rho$ is derived from the dynamic range capability of the devices and the transient response requirements of the signaling system.

The dynamic range limitation of the bucket brigade analog device delay line can be alleviated by magnitude scaling before and after the delay.

The limit on $\rho$ provided by the transient settling requirements will now be discussed.

For $\rho > 1$, the transfer function of Equation (1) can be expanded into the geometric series $$H(s) = \sum_{n=0}^{q} (-\rho e^{-s\tau})^n$$

i.e.

$$H(s) = \sum_{n=0}^{\infty} (-\rho)^n e^{-ns\tau}. \quad (9)$$

From the Laplace Transform pair $$L^{-1}\{e^{-ns\tau}\} \leftrightarrow \delta(t-n\tau) \quad 10.$$

the impulse response of the channel filter described by Equation (1) or (9) is $$h(t) = \sum_{n=0}^{\infty} (-\rho)^n \delta(t-n\tau). \quad (11)$$

From Equation (11), we may obtain an estimate of the settling time by determining when the strength of an incident impulse has decayed to less than one percent of the original value, i.e., when $$\rho^n \leq 0.01 \quad 12.$$

or $$\rho \leq 10^{-2/n} \quad 13.$$

For TOUCH-TONE frequency detection, assuming a settling time less than 40 milliseconds, $$n\tau < 40 \text{ milliseconds} \quad 14.$$

or $$n < 40/\tau,\ \tau \text{ in milliseconds} \quad 15.$$

Combining the inequalities of Equations (13) and (15), an upper bound on $\rho$ for given $\tau$ is provided by $$\rho \leq 10^{-(\tau/20)} \quad 16.$$

where $\tau$ is measured in milliseconds.

For the various values of delay for each channel the upper bound on $\rho$ calculated from Equation (16) is given in FIG. 5. Thus, for this range of delay times, the transient response requirement sets an upper limit of 0.92 on the effective attenuation in the feedback loop.

Choice of Feedback Attenuation

The filter can be used to detect a plurality of different frequencies, such as TOUCH-TONE frequencies, which are a combination of two simultaneous tones, one from a high group and one from a low group of four frequencies each. In this situation, the frequencies can be specified as center frequencies $f_o$, which can vary ±1.3 percent of $f_o$ ±4 Hz and still be detected. Hence, the range of frequencies that must be recognized is well defined. In the circuit of FIG. 1, the gain parameter $\rho$ can be varied in the range of stable performance (0 to 1) to change the selectivity (Q) of the response peak. Practical upper limits on $\rho$ are set by the desired transient response time and the dynamic range of the real devices in the circuit as previously mentioned. The lower limit is set by the desire to keep good definition between bands since, as $\rho$ goes to zero, the system response becomes flat.

A $\rho$ of about 0.92 should give 21.9 dB of midband gain, about 2 dB from the peak at $f_o$ to the comparator level at ±1.3 percent $f_o$ ±4 Hz, and at least 7 dB rejection between adjacent bands.

For use in telephone signaling, about one percent variation in $\rho$ can be tolerated. This tolerance should not be difficult to obtain with present integrated circuitry technology.

Assume now a bucket brigade device comprising a substrate with $n$ stages of storage (delay) fashioned from IGFETs and capacitances. Such a device has the property that, when clocked, an input sample is taken each clock period $T_c$, and is shifted through $n$ stages, and is available at the output a delay time $\tau = nT_c$ later without appreciable distortion or attenuation. Since $f_o = ½\tau$, it is seen that changes in $T_c$ have the effect of shifting the center frequency of the filter.

Figure 4:
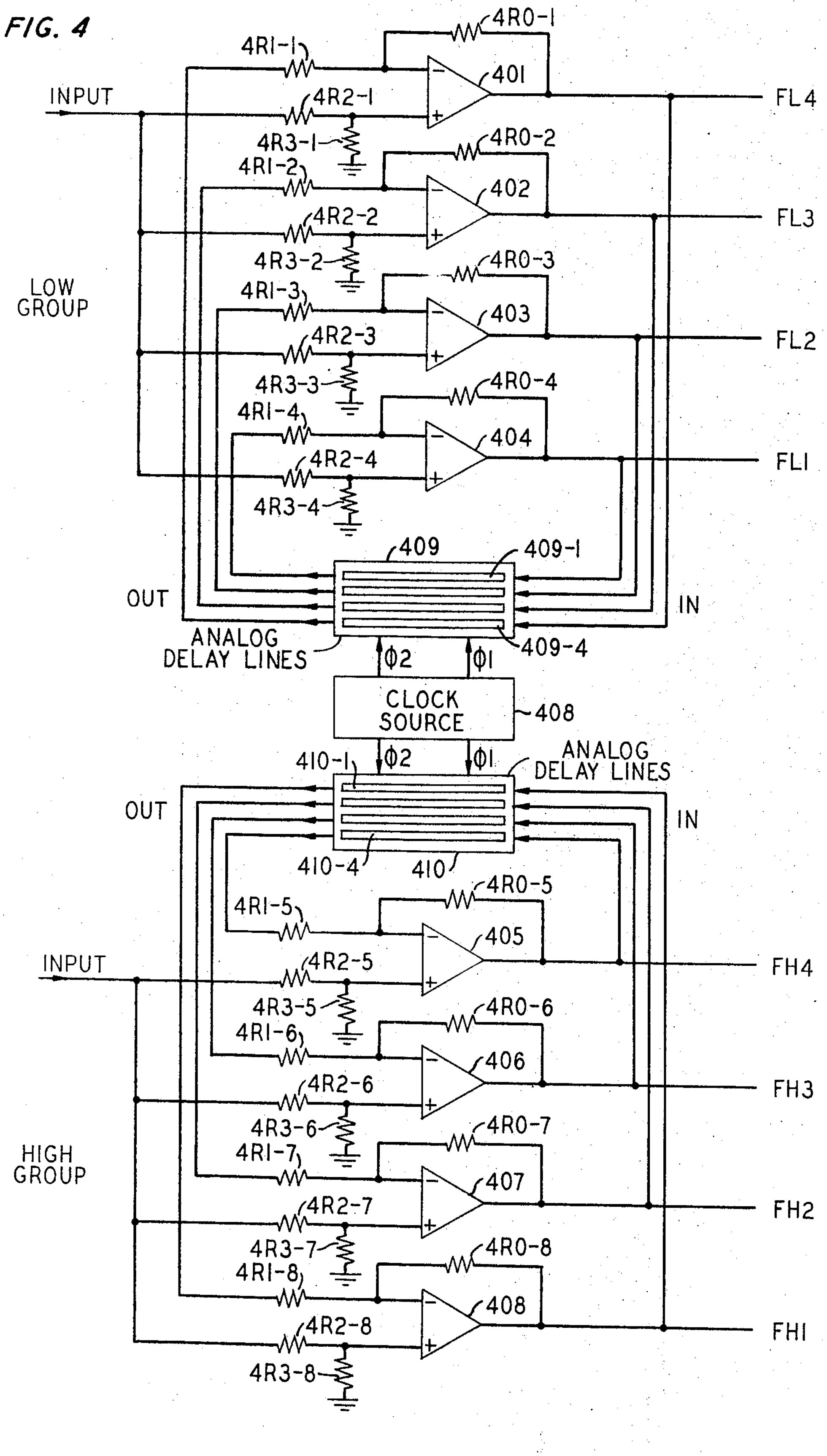
FIG. 4 is a multichannel detector with each channel controlled by separate analog delay lines.

FIG. 4 shows a typical circuit arranged for multiple frequency TOUCH-TONE detection, where four filters are associated with the high frequencies FH1–FH4 and four filters are associated with the low frequencies FL1–FL4.

For reasons of economy it is possible to use one clock source 408 for the entire set of channel filters. Thus, the eight analog delay lines, 409–1, 409–2, 409–3, 409–4, 410–1, 410–2, 410–3 and 410–4, must each contain a different number of delay stages according to the amount of delay desired. Conversely, all of the analog delays may contain the same number of delay stages and different clock rates may be used on each filter circuit.

To set precise control over the delay times, the clock source is set at 85.1 kHz and the nearest whole number $n$ in $\tau/T_c$ is chosen as the length of the delay element for each filter. FIG. 6 shows the number of bits $n$ of delay needed for each channel at a 85.1 kHz clock rate.

The quantization of delay means that channel filter peaks can only approximate the specified center frequencies. The effect of this center frequency error is to "skew" the upper and lower band edges about the new center frequency. Since the threshold level for the comparators is set for the worst case, we have in effect widened the acceptable band for some channels.

The 85.1 kHz clock frequency was selected so that the maximum percentage frequency error in filterpeak location would be 0.7 percent. The total number of delay stages for eight channels is 333. A higher frequency clock could be used to make the filter peaks approach the nominal TOUCH-TONE frequencies, at the expense of more delay stages (e.g., at 118.1 kHz the maximum error is 0.5 percent, with 463 bits of delay).

Figure 8:
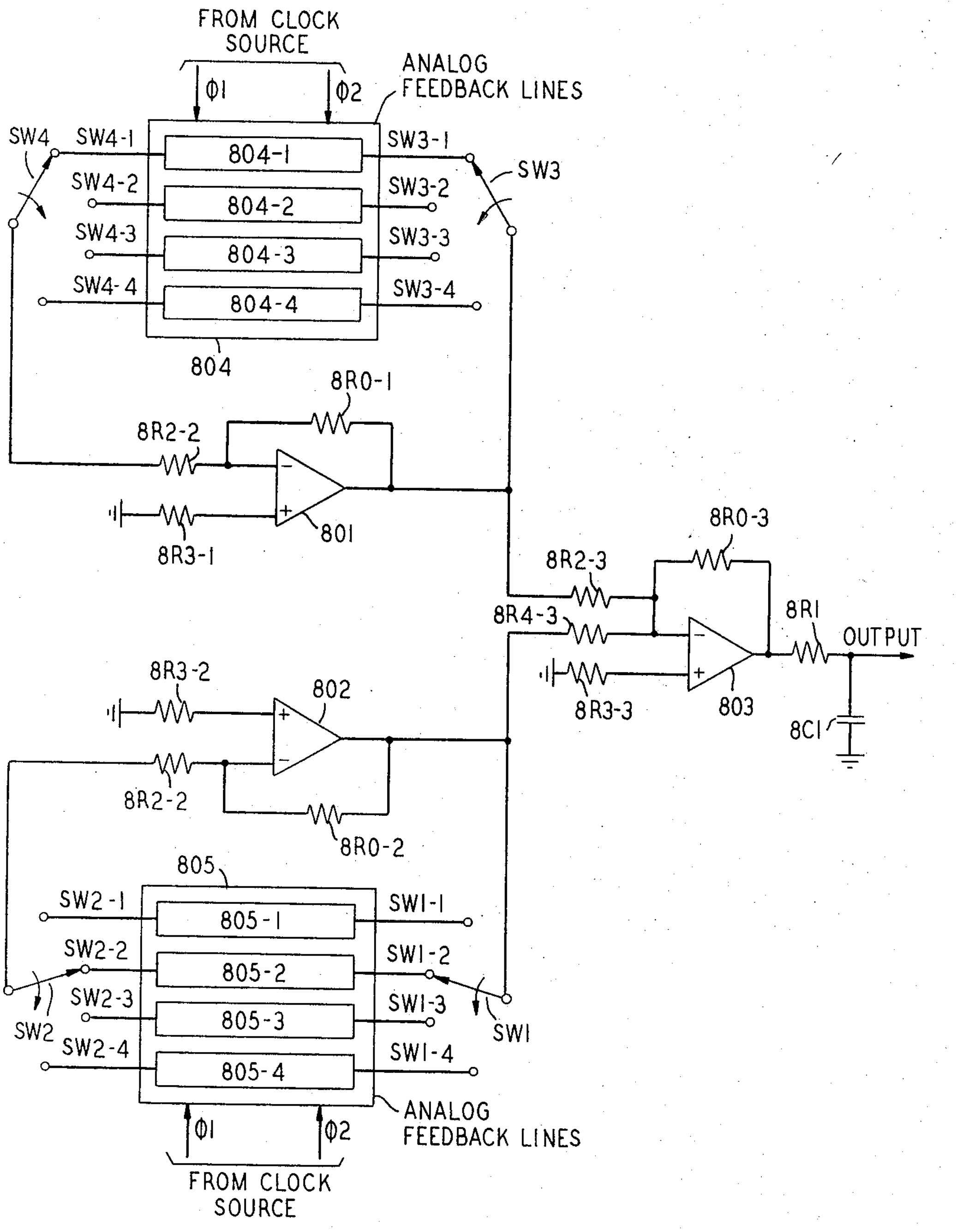
FIG. 8 is a schematic of a circuit configuration useful for developing a plurality of desired frequencies.

In the situation where the loop gain $\rho$ is greater than 1, the circuit will oscillate at a frequency controlled jointly by the clock rates $\Phi 1$ and $\Phi 2$ and the number of delay stages of the analog feedback line. FIG. 8 shows two such circuits, each controlled by a separate amplifier 801–802, with each amplifier connectable via a switch to an individual one of a number of analog feedback lines, each feedback line having a particular number of propagation stages. The outputs of each of the circuits are fed through resistors 8R2–3 and 8R4–3 to the negative input of a summation amplifier 803. Summation amplifier 803 is arranged to sum the frequencies generated by each of the circuits and to provide the output frequencies to an output via an RC filter consisting of resistor 8R1 and capacitor 8C1. Each oscillator circuit is controllable by a particular set of switches, SW1, SW2 or SW3, SW4.

For example, the oscillator circuit controlled by amplifier 801 has the output of amplifier 801 connected to the wiper of switch SW3, which switch is shown connected to terminal SW3–1 which in turn is connected to analog feedback line 804–1. The output of analog feedback line 804–1 is connected to terminal SW4–1 of switch SW4, which switch is connectable via resistor 8R2–2 to the negative input of amplifier 801. The positive input of amplifier 801 is connected to ground via resistor 8R3–1. Resistor 8R3–1 and resistor 8R0–1 are selected so that the feedback gain $\rho$ is greater than 1, thereby causing the circuit to oscillate at a frequency controlled by the amount of analog delay introduced in the feedback loop.

FIG. 9 shows the number of delay stages required for each analog feedback line as a function of the frequency output desired and as a function of the clock signal rate.

As shown in FIG. 8, assume that it is desired to establish two frequencies at the output of anplifier 803 with a frequency generated by amplifier 801 of 697 Hz and a frequency generated by amplifier 802 of 1,336 Hz. Accordingly, switches SW3 and SW4 are set for connection to analog feedback line 804–1 (as determined from FIG. 9) and switches SW1 and SW2 are set for connection to analog feedback line 805–2 (again as shown in FIG. 9). Assume also that a clock rate of 85.1 kHz is utilized. Under such an arrangement, when the power is turned on, the feedback circuit around amplifier 801 oscillates, causing a signal to appear at the output of that amplifier. The output signal is then fed back via switch SW3 and a sample of the output signal taken by analog feedback line 804–1. The sample is passed from stage to stage within the feedback line in the manner discussed previously and returned to the input of amplifier 801 via switch SW4. Accordingly, the signal frequency at the output of amplifier 801 is a function of the selected delay line. Similarly, the output of amplifier 802 is controlled by analog feedback line 805–2 so that the output of amplifier 802 becomes 1,336 Hz. The 697 Hz output from amplifier 801 is combined with the 1,336 Hz output of amplifier 802 by amplifier 803 and supplied to the output.

CONCLUSION

We have described an operational frequency-responsive circuit designed to provide output responses selectively controllable by an analog feedback delay line. The circuit has been shown to be useful as a single channel filter, multiplicity of channel filters, or as a selectable frequency generator. There is no doubt many additional circuit configurations may be developed by those skilled in the art without departing from the spirit and scope of the invention. Also, it should be noted that although a single serial bucket brigade device has been shown in the feedback path, a number of different circuit configurations and devices could be utilized to achieve the desired analog feedback necessary for the operation of our invention. In addition, the amplifier used for the summation of the signals could be replaced by any summing means, including a resistor network. The amplifier, however, is advantageous because of the adjustment available to compensate for loop attenuation.

It should also be obvious that numerous arrangements could be devised to control the feedback propagation rate, thus controlling the frequency response of the circuit. Some of these arrangements could be mechanical, as are the switches shown in FIG. 8, or could be electronic in nature thereby directly controlling either the clock rate or the number of propagation stages of the analog delay device.

What is claimed is:

1. A circuit for developing output signals, said circuit comprising:

summation means having at least one input and an output; and means for establishing an output signal at said output of said summation means, said establishing means including means for taking analog samples of said established output signal, means for delaying said analog-sampled signals, said delaying means including an analog delay line having a controllable signal sample propagation rate, and means for applying said delayed output signals to an input of said summation means, thereby establishing said output signal in conjunction with any other input signal to said summation means.

2. The invention set forth in claim 1 further comprising a clock source operable for providing two clock pulses for controlling said signal sample propagation rate, and wherein said analog sample taking means includes means for taking said samples of said establishing output signal under control of both of said clock pulses so as to establish said output signal as a full analog of said input signal.

3. The invention set forth in claim 1 wherein said analog delay line is a bucket brigade device having a plurality of sequentially interconnected stages through which said analog-sampled signals are propagated.

4. The invention set forth in claim 3 further comprising means for selectively controlling the number of said stages through which said analog-sampled signals are propagated.

5. The invention set forth in claim 3 further comprising means for providing periodic clock signals wherein said analog-sampled signals are moved sequentially from stage to stage through said bucket brigade device under control of said periodic clock pulses.

6. The invention set forth in claim 1 further comprising:

a plurality of summation means, each having at least one input and an output; and means for establishing an output signal at said output of each said summation means, said establishing means including means for taking analog samples of each said established output signal, means for delaying each said analog-sampled signal, and means for applying each said delayed analog-sampled signal to an input of the corresponding summation means from which said delayed analog-sampled signal was sampled.

7. The invention set forth in claim 6 wherein each said signal establishing means includes an analog delay line having a controllable propagation rate.

8. The invention set forth in claim 7 wherein each said analog delay line comprises a bucket brigade device having a plurality of sequentially interconnected stages through which said analog-sampled signals are propagated.

9. The invention set forth in claim 8 further comprising means for selectively controlling the number of said stages through which said analog-sampled signals are propagated.

10. The invention set forth in claim 8 further comprising means for providing periodic clock pulses wherein each said analog-sampled signal is moved from stage to stage through an independent one of said analog delay lines under control of said periodic clock pulses.

11. A filter circuit having input and output terminals comprising:

signal summation means having first and second input terminals and an output terminal common with said filter output terminal;

means for connecting said filter circuit input terminal to said first terminal of said signal summation means;

analog feedback means comprising an analog delay line having a controllable signal sample propagation rate and having input and output terminals, said analog feedback means input terminal being common with said signal summation means output terminal and with said filter circuit output terminal; and means for connecting said output terminal of said analog feedback means to said second input terminal of said signal summation means.

12. The invention set forth in claim 11 wherein said analog delay line comprises a bucket brigade device.

13. The invention set forth in claim 12 further comprising means for providing periodic clock signals wherein the propagation rate of said analog-sampled signals through said bucket brigade deice is controlled by said periodic clock pulses.

14. The invention set forth in claim 11 wherein said analog delay line comprises a plurality of sequential stages through which an analog-sampled signal is propagated and wherein the delay time of said delay line is selectively controllable by means for establishing the number of stages through which a particular analog-sampled signal is propagated.

15. The invention set forth in claim 11 further comprising means for controlling the feedback loop gain from said filter circuit output terminal through said analog delay line and through said summation means back to said filter circuit output terminal.

16. The invention set forth in claim 15 wherein said summation means includes an operational amplifier.

17. The invention set forth in claim 16 wherein said feedback loop gain control means includes a first resistor connected between said analog feedback means output terminal and said second input terminal of said operational amplifier; and a second resistor connected between said second input terminal of said operational amplifier and said output terminal of said operational amplifier.

18. The invention set forth in claim 11 further comprising:

a plurality of said filter circuits arranged into groups;

means for connecting in common said input terminals of all said filter circuits of the same group;

means for providing an input signal to each said common group of input terminals; and means for adjusting said analog feedback line associated with each said filter circuit to give an output response at said output terminal uniquely associated with each said filter circuit only when said input signal is of a certain frequency.

19. The invention set forth in claim 18 wherein all of said analog delay lines are bucket brigade devices having a plurality of delay stages through which analog signals are propagated.

20. The invention set forth in claim 19 wherein all of said bucket brigade delay lines are controllable from a single clock source.

21. The invention set forth in claim 11 wherein the feedback path which extends from said filter circuit output terminal through said analog delay line and through said summation means has an adjustable gain.

22. The invention set forth in claim 21 wherein said gain is adjusted to give a gain of 1 or greater so that said filter circuit becomes an oscillator circuit and will oscillate at a frequency controllable by said analog delay line.

23. The invention set forth in claim 22 further comprising a plurality of said oscillator circuits, means for connecting the outputs of said oscillator circuits together; and means for controlling the analog feedback delay associated with each said oscillator circuit thereby establishing a particular output frequency at said oscillator circuit output.

24. The invention set forth in claim 23 wherein said analog delay line comprises a bucket brigade device having a number of sequential delay stages.

25. The invention set forth in claim 24 wherein said analog control means includes means for controlling the number of said stages of analog feedback delay.

26. An oscillator circuit for developing an output signal having a certain frequency, said circuit comprising:

means for establishing an output signal, said establishing means including
means for taking analog samples of said established output signal;
means for delaying said analog-sampled signal, said means including an analog delay line having a controllable signal sample propagation rate;
means for amplifying said delayed analog-sampled signal to establish a loop gain equal to or greater than 1; and
means for applying said amplified signal to said output of said circuit thereby establishing said output signal at a frequency controlled by said delaying means.

27. The invention set forth in claim 26 wherein said analog delay line is a bucket brigade device having a plurality of sequentially interconnected stages through which said analog-sampled signals are propagated.

28. The invention set forth in claim 27 further comprising means for selectively controlling the number of said stages through which said analog-sampled signals are propagated.

29. The invention set forth in claim 28 further comprising means for providing periodic clock signals wherein said analog-sampled signals are moved sequentially from stage to stage through said bucket brigade device under control of said periodic clock pulses.

* * * * *

UNITED STATES PATENT OFFICE
CERTIFICATE OF CORRECTION

Patent No. 3,824,413 Dated July 16, 1974

Inventor(s) Mebenin Awipi, Sotirios Constantine Kitsopoulos and Donald Steven Levinstone It is certified that error appears in the above-identified patent and that said Letters Patent are hereby corrected as shown below:

Column 1, line 36, change "economics" to --economies--.

Column 3, line 40, change "bridage" to --brigade--.

Column 5, line 31, change ">" to -- < --;

line 35, change "q" to -- ∞ --.

Column 6, line 58, change "set" to --get--.

Signed and sealed this 3rd day of December 1974.

(SEAL)
Attest:

McCOY M. GIBSON JR.
Attesting Officer

C. MARSHALL DANN
Commissioner of Patents